United States Patent [19]

Chambers

[11] 3,997,012
[45] Dec. 14, 1976

[54] ROLLER ASSEMBLY

[76] Inventor: Robert B. Chambers, 607 Krall St., Boise, Idaho 83702

[22] Filed: Feb. 27, 1975

[21] Appl. No.: 553,736

[52] U.S. Cl. .................................. 177/16; 177/212; 177/249; 74/63
[51] Int. Cl.$^2$ ................... G01G 11/14; G01G 1/38; G01G 1/36; F16H 21/12
[58] Field of Search ..................... 177/16, 212, 249; 74/63

[56] References Cited
UNITED STATES PATENTS

| | | | |
|---|---|---|---|
| 3,155,181 | 11/1964 | Chambers | 177/16 |
| 3,316,989 | 5/1967 | Griffiths | 177/16 |
| 3,512,596 | 5/1970 | Haack | 177/16 X |

FOREIGN PATENTS OR APPLICATIONS

| | | | |
|---|---|---|---|
| 378,121 | 7/1964 | Switzerland | 177/16 |

*Primary Examiner*—George H. Miller, Jr.
*Attorney, Agent, or Firm*—Hill, Gross, Simpson, Van Santen, Steadman, Chiara & Simpson

[57] ABSTRACT

A device for converting a constant rotational input into a rotational output which is proportional to a separate input signal characterized by first and second members each having a surface of revolution about an axis with the surface of at least one of the members having an axially changing diameter and the first and second members being mounted for rotation with their surfaces adjacent one another, means for rotating the first member, a transfer device including a pair of rollers mounted for rotation in a plane of rotation for engaging the surfaces of the first and second members and for transmitting rotation of the first member to the second member, the transfer means is connected to a supporting device by a pivot connection having a pivot axis lying in the plane of rotation, and a device for shifting the transfer device along the axis of one of the first and second members to vary the rate of rotation of the second member.

6 Claims, 5 Drawing Figures

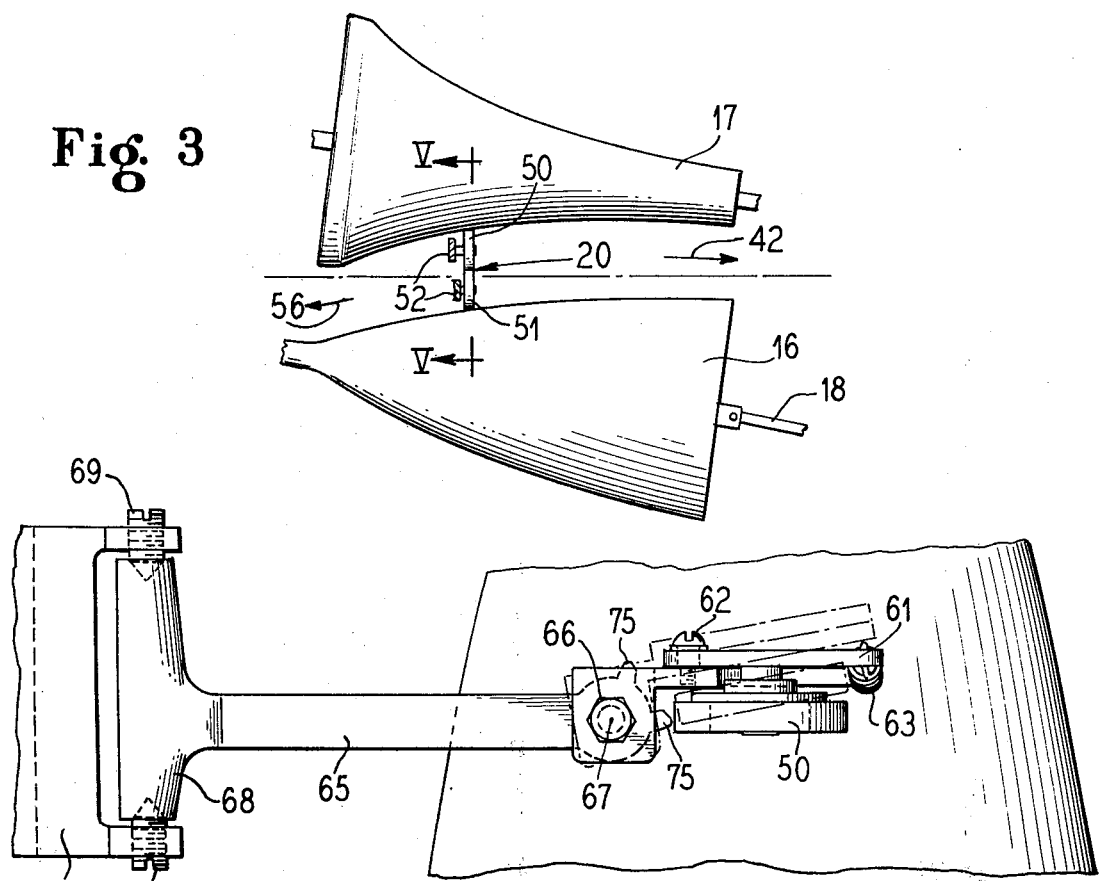
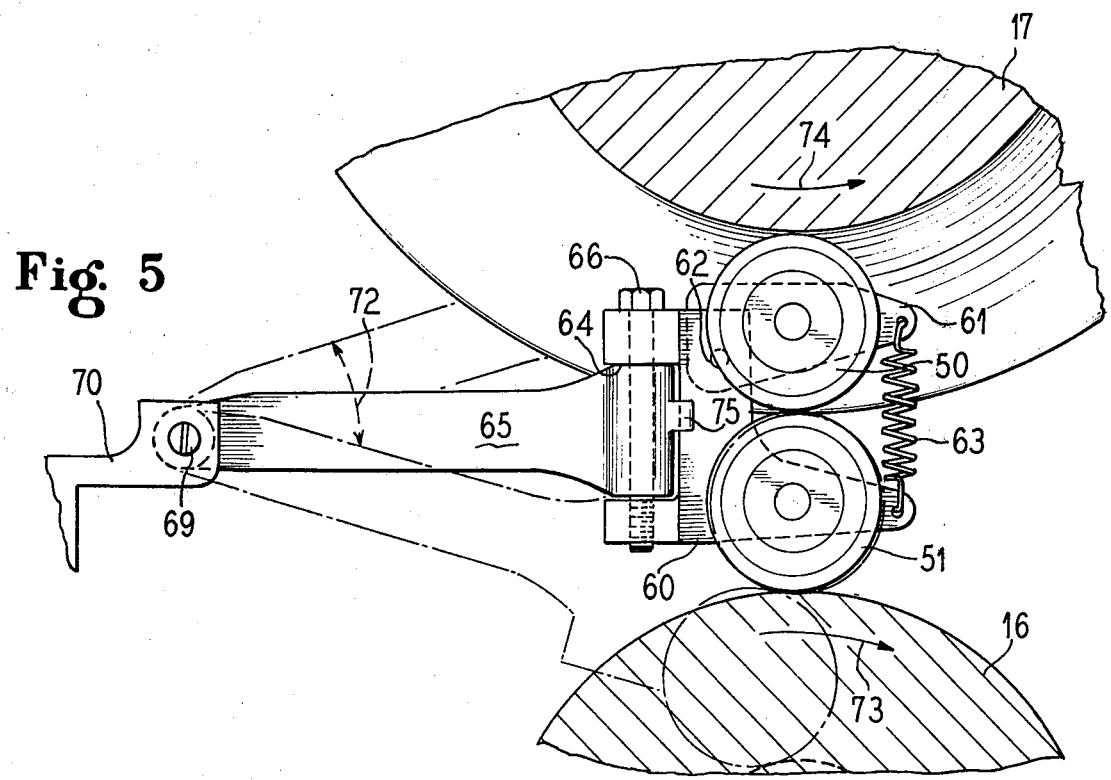

ROLLER ASSEMBLY

BACKGROUND OF THE INVENTION

1. Field of the Invention

The present invention is directed to a device for converting a constant rotational input into a rotational output which is proportional to a separate input signal.

2. Prior Art

A conveyor scale and recorder, which was operated by a belt conveyor and gave a continual record of the weight of material being transported on the conveyor belt, is disclosed in U.S. Pat. No. 3,155,181. The scale had a pair of cones which were mounted with their axes in parallel for rotation, one of the cones was driven by the belt of the conveyor and a transfer means or device was disposed between the cones for transferring the rotation of the one cone to drive the other cone whose output shaft was connected to a counter or recorder. The transfer means utilizes a pair of friction balls which were supported in a race or cage by a plurality of spools and was shifted along the axes of the pair of cones in response to sensed weight conditions on the belt.

The above described scale of the above mentioned patent has met with commercial success but has also encountered several undesirable problems. For example, the friction balls and spools of the cage provide a drag which is undesirable. The friction balls and retaining spools as well as the bearings and journals for the spools in the retainer cage are subjected to wear. Such wear will cause a tendency of the contact points between the cones and their respective friction balls to vary.

In the transfer means of the patent, the action of the surfaces of the cones especially in the areas of high angular contact apply a shifting force to the ball cage which may affect the position of the weight of the weight bar. This force on the weight is undesirable.

In addition, the friction ball and the ball cage require a certain amount of space between the two cones and thus limits a size reduction of the device for small scales. The structure for guiding the cage as it travels in the axial direction along the surfaces of the cones also requires a complicated arrangement of guide bars and supports.

SUMMARY OF THE INVENTION

The present invention is directed to a device for converting a constant rotational input into a rotational output which is proportional to a separate input signal such as a sensed weight on a conveyor belt. The device of the present invention is not subjected to drag and wear of the transfer means and thus eliminates or reduces the tendency of contact points between the rotating surfaces and the transfer means to vary. The present invention also eliminates the tendency of the transfer means to be shifted due to the reaction force created between the surfaces of the rotating members and cones, and the device utilizes a transfer means which can be made for a small device and eliminates several elements for guiding and supporting the transfer means.

To accomplish these tasks, the device comprises a first member and a second member, each of said members having a surface of revolution about an axis with the surface of at least one of said members having an axially changing diameter, means for mounting said first and second members for rotation with their surfaces adjacent to one another, means for rotating the first member, transfer means for engaging the surface of the first and second member and for transmitting rotation of the first member to the second means, means for supporting the transfer means, and means for shifting the transfer means along the axis of one of said first and second members to vary the rate of rotation of the second member. The transfer means includes a pair of rollers, means for mounting the rollers for rotation on parallel axes in a plane of rotation and pivot means having a pivot axis lying in the plane of rotation for connecting the mounting means to the means for supporting. Preferably, the members are cones with their axes mounted in parallel relationship and the supporting means for the transfer means includes a pair of parts with a pivot means, which has a pivot axis extending perpendicular to the first mentioned pivot axis for interconnecting the two parts and enabling vertical movement of the transfer means as it is moved along the members.

BRIEF DESCRIPTION OF THE DRAWINGS

FIG. 3 is a diagrammatic view of the rotating cones and transfer means of the present invention;

FIG. 4 is a partial plan view of the transfer means engaging the lower cone of the present invention; and FIG. 5 is a partial cross-sectional view with portions in elevation taken along lines V—V of FIG. 3.

DESCRIPTION OF THE PREFERRED EMBODIMENTS

Figure 1:
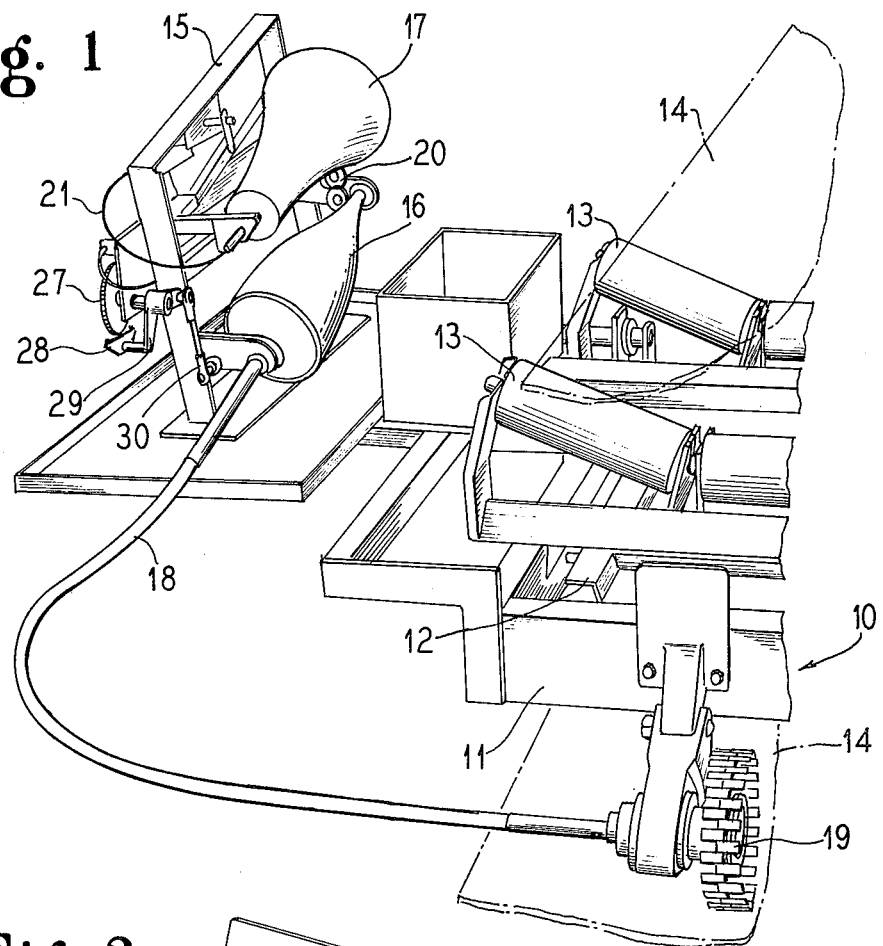
FIG. 1 is an isomeric view of a conveyor scale and recorder with the device in accordance with the present invention.
Figure 2:
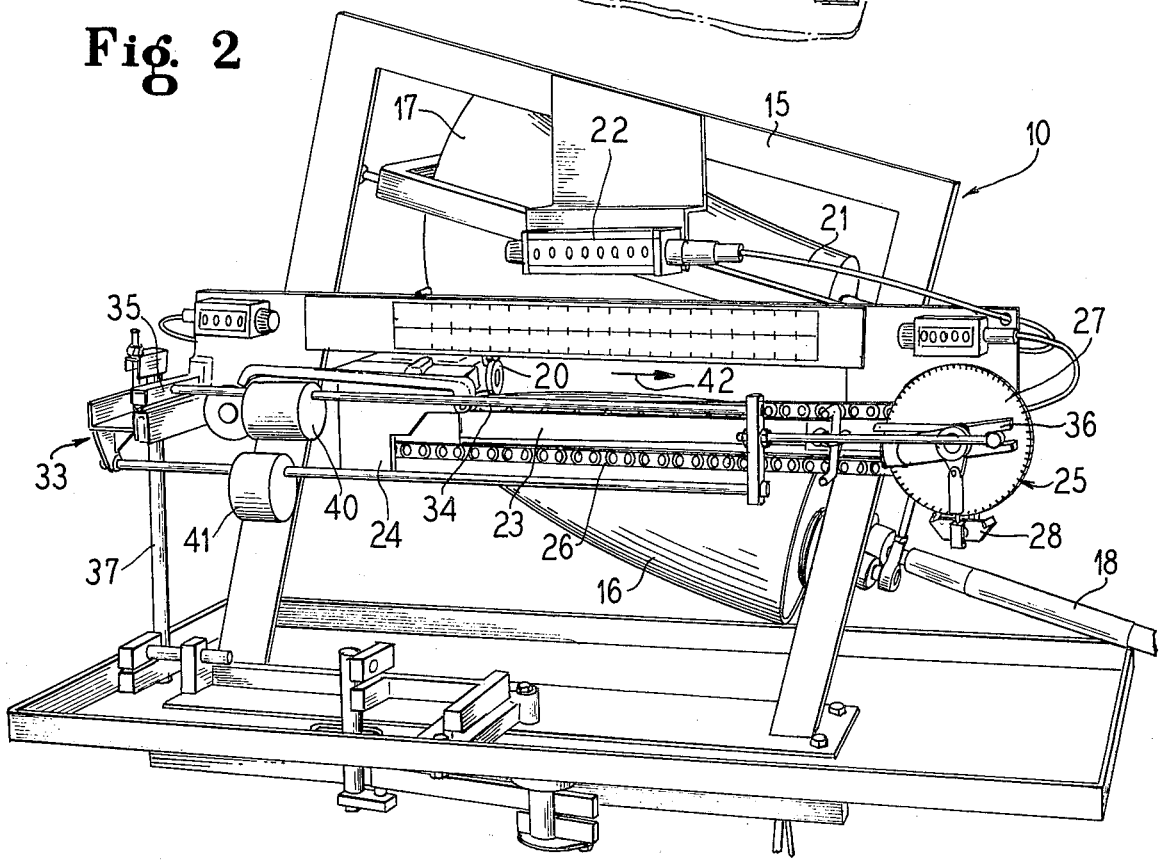
FIG. 2 is a side view with portions removed for purposes of illustration of the conveyor scale and recorder of FIG. 1.

The principles of the present invention are particularly useful in a conveyor scale and recorder generally indicated at 10 in FIGS. 1 and 2. The scale 10 includes a frame 11 which supports a sensing frame 12 which is positioned under a pair of trough idlers 13, 13, which act as sensing idlers for sensing the load carried on the belt 14 of the belt conveyor. Adjacent to the conveyor and on one side of the frame 11 is a sub-frame 15 which rotatably supports a first cone member 16 and a second cone member 17 with their axes being parallel. The first cone member 16 is driven by a flexible shaft 18 extending to a timing wheel 19 which is mounted on the frame 11 and is biased into engagement with the return portion of the belt 14. Thus, the first cone member 16 rotates at a speed determined by the speed of the belt 14 on the belt conveyor.

A transfer means 20 which includes a pair of rollers or rotors engages the surfaces of the two cone members 16 and 17 to transfer rotation of the first member 16 to the second member 17. The output of the second cone member 17 is conducted through a flexible cable 21 to a recorder or indicator 22 (FIG. 2) and, if necessary, through an appropriate reduction device.

The transfer means 20 is mounted in sub-frame 15 on a guide means such as a bar guide 23 for movement along the axes of the members 16 and 17 by support means including a support housing 24. The support housing 24 is mounted on bar guide 23 and is moved thereon by a shifting means generally indicated at 25 which means shifts the transfer means axially along the surfaces of the members 16 and 17.

The shifting means 25 includes a chain 26 connected to the housing 24, means for shifting or moving the chain which includes a double ratchet wheel 27 having a pawl 28 which is carried on an oscillating arm 29 which is oscillated through a given arc by an eccentric drive 30 attached to the drive shaft 18 of the lower cone member 16. The eccentric drive 30 oscillates the arm 29 through one cycle for each rotation of the cone member 16.

To energize the shifting means 25, the signal applying means 33, which includes a weight bar or balance beam 34, which is mounted on the frame 15 by a pivot fulcrum 35 with one end slidably received in a control member 36, is provided. Means for pivoting the weight bar 34 on its fulcrum 35 in response to the load sensed by the sensing rollers 13, 13 is illustrated as comprising a linkage 37 that is attached to the end adjacent the fulcrum 35 and is connected to the support frame 12. A shiftable weight 40 is slidably received on bar 34 and is interconnected with the housing 24 of the support means so that the weight moves with the transfer means 20. Additional adjusting weights 41 are present to adjust the balance position of weight bar 34.

As illustrated in FIG. 2, the transfer means 20 is in a position for no load on the belt 14 and while in this position the transfer means 20 is out of engagement with the cone member 17 so that it is not rotated.

Assuming the belt receives a load, the linkage 37 pivots the weight bar 34 from a neutral or null position to rotate the control member 36 in a counterclockwise direction to cause engagement of the pawl member 28 to rotate the ratchet wheel 27 to move the chain 26 to shift the transfer means 20 in the direction of arrow 42. As the transfer means shifts in the direction 42, the weight 40 is moved on the weight bar 34 to counterbalance the force causing pivoting of the weight bar 34. When the weight 40 reaches a position on the bar 34 to balance the force applied by the linkage 37, the weight bar returns to the neutral position and causes the control member 36 to move the pawl 28 to a neutral position which is disengaged from the ratchet wheel 27 to prevent further movement on the chain 26.

In a similar manner, a decrease load on the belt is sensed causing the weight 40 to shift the weight bar in a clockwise direction to act on the control member 36 which causes the pawl 28 to engage the ratchet wheel 27 to move the chain in the opposite direction so that the housing 24, the transfer means 20 and weight 40 are shifted in a direction opposite to the arrow 42 until the bar 34 assumes a balance condition.

The axial position of the transfer means 20 between the first and second cones determines the rate of rotation of the second cone as it is driven by the constant rate of rotation of the first cone. The rate of rotation of the second cone is connected to a counter or other sensing device to give an indication of the load being carried on the conveyor belt 14. It should be pointed out that a more detailed description of the operation of this type of scale device 10 is described in U.S. Pat. No. 3,155,181. The cone members 16 and 17 are surface of revolution which have a contoured non-linear side surfaces.

As best illustrated in FIG. 3, the transfer means 20 includes a pair of very thin or narrow rollers or rotors 50 and 51 and means 52 which mounts the rollers with their axes parallel. With the transfer means 20 in the position illustrated in FIG. 3, the upper or second cone member 17 will be driven at a given rate dependent on the ratio of the diameter of the engaged portions of the second cone and the diameter of the engaged portion of the first cone 16. Movement or shifting of the transfer means 20 in the direction of arrow 42 changes the engaged portions so that the roller 51 will engage a surface having an increased diameter and the roller 50 will engage a surface of the cone 17 having a decreased diameter so that the rate of rotation of the upper cone 15 will be increased although the cone 16 is driven at a constant speed. In a similar manner, movement of the transfer means 20 in the opposite direction such as indicated by the arrow 56 will decrease the rate of rotation of the upper cone 17 due to engagement of the roller 50 with a portion of the conical surface having a larger diameter and the roller 51 engaging a portion of the conical surface of the cone 16 having a smaller diameter.

The means for mounting 52 as best illustrated in FIG. 4 mounts the rollers 50 and 51 so that they are rotating in substantially the same plane of rotation. The narrow rollers have a width of approximately ¼ inch and rotate in a plane of rotation. The means for mounting as illustrated includes a first member 60 which carries the bearings for supporting the roller 51 and has a second member 61 connected by a pivot connection 62. The second member 51 supports the bearings for the roller 50 and is connected by a resilient means such as a spring 63 which biases the rollers into rolling contact with each other.

The member 60 is provided with a clevis 64 which receives a part or arm 65 for the support means. The arm 65 is connected by a pivot means illustrated as a pin or bolt 66 which has a pivot axis 67 (FIG. 4) which lies substantially in the plane of rotation of the rollers 51 and 52. The clevis portion 64 and the pin 66 provide the pivot means for connecting the mounting means 52 to the arm 65.

The arm 65 has a portion 68 which is pivotably mounted by set screws 69, 69 in a second part or portion 70 of the support means which part may be an extension of the housing 24. This pivotable connection forms a second pivot means having an axis extending perpendicular to the axis 67 and enables the part 65 to move in a vertical plane through an arc 72 (FIG. 5) to vertically adjust the position of the transfer means 20 as it is shifted along the conical surfaces. The provision of the second pivot means enables utilizing a simplified structure such as guide bar 23 for the means that guides and supports the transfer means 20.

As illustrated in FIG. 5, the member 16 is driven in the direction of arrow 73 and the transfer means drives the second member 17 in the direction of the arrow 74. The direction of rotational movement of the two members 16 and 17 pulls and holds the transfer means 20 between the members 16 and 17.

As the transfer means 20 is shifted axially along the surface of the cones such as 16 and 17, the first pivot means allows the rollers or rotors 50 and 51 to pivot to enable tracking on the surface of the cones 16 and 17. This pivoting of the rollers 50 and 51 reduces wear on their contact or rolling surfaces, and the wear on the surfaces of the members 16 and 17. The pivoting also reduces wear on the bearings which are used to mount the rollers. Usually, the amount of pivoting is approximately 5° from the center line position. The pivot connection also enables pivoting of the transfer means when the rollers have a sharp angle contact with the surfaces of the members 16 and 17. Such pivoting reduces or eliminates the application of any transverse forces onto the support means and eliminates any thrust which would act on the shifting means or move the weight of 40 on the weight bar 34.

Due to the direction of rotation of the members 16 and 17 during a conveying operation, the amount of pivoting on the first pivot means is, as mentioned above, limited to a few degrees. However, it is found advisable to provide the pivot means with stop means such as projections 75, 75 to limit the amount of pivotable movement through a given arc such as 45°. Any pivoting greater than this amount may cause the transfer means to move out of contact with the surfaces of the cones 16 and 17. This is particularly important during a reverse movement or back-up of the conveyor belt which would rotate the driven member 16 in a direction opposite to the arrow 73 and attempt to eject the transfer means 20.

As mentioned above, the use of rollers or rotors 50 and 51 enables reducing the size of the transfer means between the pair of members 16 and 17. For example, the rollers 50 and 51 can have a diameter of approximately 1½ inches and are mounted on ball bearings having outside race of approximately ¾ inch. The rollers are provided with a rubber or synthetic rubber face. The size of the rollers can be reduced as desired for use in small devices.

While the above description of the device is used in the preferred embodiment of a scale, it should be understood that the transfer device 20 could be used in other systems and with other members having a surface of revolution other than the illustrated cones. For example, one member could be a cylinder with the other member having a surface of revolution whose diameter changes along its axis of rotation.

Although minor modifications might be suggested by those versed in the art, it should be understood that I wish to employ within the scope of the patent granted hereon all such modifications as reasonably and properly come within the scope of my contribution to the art.

I claim:

1. A device for converting a constant rotational input into a rotational output which is proportional to a separate input signal comprising a first member and a second member, each of said members having a surface of revolution about an axis with the surface of at least one of said members having an axially changing diameter, means for mounting said first and second members for rotation in a frame with their surfaces adjacent one another, means for rotating the first member, transfer means for engaging the surfaces of the first and second members and for transmitting rotation of the first member to the second member, means for supporting the transfer means in said frame, and means for shifting the transfer means on the means for supporting along the axis of one of said first and second members to vary the rate of rotation of the second member, said transfer means including a pair of rollers, means for mounting the rollers for rotation on parallel axes in a plane of rotation and pivot means having a pivot axis lying in said plane of rotation for connecting the mounting means for the rollers to the means for supporting, said mounting means for the rollers including a first member supporting one of the pair of rollers, a second member supporting the other of the pair of rollers and pivotally mounted on the first member, and means biasing the rollers into rolling engagement with each other so that said mounting means for the rollers pivots on said pivot axis as the shifting means moves the rollers along the axis of the one member.

2. A device for converting a constant rotational input into a rotational output which is proportional to a separate input signal comprising a first member and a second member, each of said members having a surface of revolution about an axis with the surface of at least one of said members having an axially changing diameter, means for mounting said first and second members for rotation in a frame with their surfaces adjacent one another, means for rotating the first member, transfer means for engaging the surfaces of the first and second members and for transmitting rotation of the first member to the second member, means for supporting the transfer means in said frame, and means for shifting the transfer means on the means for supporting along the axis of one of said first and second members to vary the rate of rotation of the second member, said transfer means including a pair of rollers, means for mounting the rollers for rotation on parallel axes in a plane of rotation and first pivot means having a pivot axis lying in said plane of rotation for connecting the mounting means for the rollers to the means for supporting, said means for supporting including a second pivot means having a pivot axis extending transverse to the pivot axis of the first pivot means to enable adjustment of the position of the mounting means for the rollers relative to the first and second members so that said mounting means for the rollers pivots on said pivot axis as the shifting means moves the rollers along the axis of the one member.

3. A device for converting a constant rotational input into a rotational output which is proportional to a separate input signal comprising a first member and a second member, each of said members having a surface of revolution about an axis with the surface of at least one of said members having an axially changing diameter, means for mounting said first and second members for rotation in a frame with their surfaces adjacent one another, means for rotating the first member, transfer means for engaging the surfaces of the first and second members and for transmitting rotation of the first member to the second member, means for supporting the transfer means in said frame, and means for shifting the transfer means on the means for supporting along the axis of one of said first and second members to vary the rate of rotation of the second member, said transfer means including a pair of rollers, means for mounting the rollers for rotation on parallel axes in a plane of rotation and first pivot means having a first pivot axis lying in said plane of rotation for connecting the mounting means for the rollers to the means for supporting and including stop means to limit the amount of pivoting about the first pivot axis, said mounting means for the rollers including a first member supporting one of the pair of rollers, a second member supporting the other roller and connected to the first member by a pivot connection extending transverse to said first pivot means, and means biasing the pair of rollers into engagement with each other so that said mounting means for the rollers pivots on said first pivot axis as the shifting means moves the rollers along the axis of the one member.

4. A device according to claim 3, wherein the means for supporting includes at least two parts and second pivot means for interconnecting the two parts, said second pivot means having a pivot axis extending substantially perpendicular to the pivot axis of the first mentioned pivot means.

5. In a device for use in indicating weight on a conveyor belt or the like comprising a pair of cones mounted in a frame for rotation about substantially parallel axes, means for rotating one of the pair of cones as a direct function of the rate of movement of a conveyor belt, transfer means for engaging the surfaces of the pair of cones and transmitting rotation of the one cone to the other cone of said pair, means for supporting the transfer means on the frame for movement along the axes of the pair of cones and means for shifting the transfer means in response to weight on the conveyor belt, the improvements comprising said transfer means including a pair of rollers, means for mounting the rollers for rotation on parallel axes in a plane of rotation, first pivot means having a first pivot axis lying in said plane of rotation for connecting the means for mounting the rollers to the means for supporting the transfer means, and the means for supporting including a pair of members, a second pivot means for interconnecting the pair of members, said second pivot means having a pivot axis extending transverse to the pivot axis of the first pivot means to enable vertical movement of the transfer means to compensate for the vertical displacement so that as the shifting means moves the rollers along the axes of the pair of cones, said means for mounting pivot on said first pivot axis.

6. In a device according to claim 5, wherein the mounting means for the pair of rollers includes a first member supporting one of the pair of rollers, a second member mounting the other roller, pivot means extending transverse to said first pivot means for interconnecting said first and second members, and means biasing the rolling surfaces of the rollers into engagement.

* * * * *